United States Patent [19]

Cripps et al.

[11] Patent Number: 4,714,922
[45] Date of Patent: Dec. 22, 1987

[54] INTERCONNECTION NETWORKS

[75] Inventors: Martin D. Cripps, London; Anthony J. Field, Christchurch, both of England

[73] Assignee: National Research Development Corporation, London, England

[21] Appl. No.: 22,607

[22] Filed: Mar. 4, 1987

Related U.S. Application Data

[63] Continuation of Ser. No. 668,858, Nov. 6, 1984, abandoned.

[30] Foreign Application Priority Data

Nov. 8, 1983 [GB] United Kingdom ............... 8329728

[51] Int. Cl.⁴ .............................................. H04Q 1/00
[52] U.S. Cl. ............................. 340/825; 340/825.03; 340/825.54
[58] Field of Search ............... 379/258, 268, 272, 280; 364/200, 900; 340/825

[56] References Cited

U.S. PATENT DOCUMENTS

| | | | |
|---|---|---|---|
| 3,129,407 | 4/1964 | Paull | 340/825.03 |
| 3,349,186 | 10/1967 | Bereznak | 179/18 GF |
| 3,629,512 | 12/1971 | Yuan | 179/18 GE |
| 3,646,368 | 2/1972 | Mills | 179/18 G F X |
| 4,038,638 | 7/1977 | Hwang | 340/825.8 |
| 4,365,292 | 12/1982 | Barnes et al. | |
| 4,518,960 | 5/1985 | Clark | 340/825.03 X |

OTHER PUBLICATIONS

Conference Proceedings of the 6th Annual Symposium on Computer Architecture, Apr. 23-25, 1979, pp. 168-177, J. H. Patel: "Processor-Memory Interconnections for Multiprocessors".

Conference Proceedings of the 9th Annual Symposium on Computer Architecture, Apr. 26-29, 1982, pp. 181-189, Woei Lin et al: "Design of a 2x2 Fault-Tolerant Switching Element".

*Primary Examiner*—Ulysses Weldon
*Attorney, Agent, or Firm*—Cushman, Darby & Cushman

[57] ABSTRACT

A serial switched interconnection network comprises several stages of switching units each having a plurality of source ports and destination ports interconnected so that any source port of the first stage can be connected to any destination port of the final stage by operation of switching units in successive stages. Connections are by shared data and control paths each of which paths may comprise a single line or multiple lines and each switching unit when switched to along a path sends a request back up that path for sufficient data signals to operate the switching unit initiating the request. The setting up of a path through the network is thus stage-by-stage asynchronously.

10 Claims, 3 Drawing Figures

4,714,922

INTERCONNECTION NETWORKS

This is a continuation of application Ser. No. 668,858, filed Nov. 6, 1984, which was abandoned upon the filing hereof, now abandoned.

FIELD OF THE INVENTION

This invention relates to interconnection networks. Such networks are designed to switch a multiplicity of sources to any of a multiplicity of destinations for the transmission of signals, which may be in digital form. The connections when made may operate as two-way connections to enable signals to pass in either direction.

BACKGROUND OF THE INVENTION

Interconnection networks are widely used in telephone exchanges. The well-known crossbar exchange with its separate connections available between every source and every destination is however expensive. An alternative type of interconnection network has been proposed which consists of a number of switches each having a plurality of source ports and destination ports with the ability to switch any of its sources to any of its destinations. Several stages of rows of such switches are provided with the destination ports of one stage being connected to the source ports of the next stage. Each switch can have quite a small number of source and destination ports, for example only two or four each, however, it is possible by appropriately connecting the stages to provide a large fully interconnected network.

In general, for switches having b×b source and destination ports a total of $nb^{n-1}$ switches can be arranged in n stages of $b^{n-1}$ switches in each stage to give a $b^n \times b^n$ network.

A network may carry information either in serial form or in parallel using multiple connections. A network may be switched either by using control paths which are separate from the information paths or else by sharing the same paths both for control and for information. Networks which carry information in parallel form or which have separate control paths are complex and require a large number of interconnections between network components. Networks which carry information serially and which provide switching along the same paths as the information signals are termed serial switched networks and are inherently simpler and require considerably fewer circuit interconnections.

SUMMARY OF THE INVENTION

It is an object of the invention to provide a serial switched interconnection network of improved performance and reduced cost.

According to the invention a serial switched interconnection network comprises a plurality of stages of switching nodes, each node having a number of paths thereto and a number of paths therefrom and a switching unit being provided at each node to connect any path thereto to any path therefrom in accordance with switching signals, the nodes of successive stages being so interconnected that any path to the first stage of nodes can be ultimately connected to any path from the final stage of nodes, each switching unit having means for sending a request for switching signals back up a path thereto when addressed along that path and means enabling the selfsame switching unit to switch the said path to a path therefrom on receipt of switching signals provided in response to such request.

Preferably the means for sending a request for switching signals comprises means for requesting only those switching signals sufficient to switch the unit from which the request is initiated.

In a preferred embodiment of the invention each switching unit has source ports and destination ports with the paths to a node being connected to the source ports and the paths from a node emerging from the destination ports. Preferably each path comprises a plurality of lines. The lines of each path may include separate lines for the passage of signals in respective opposite directions. Additionally each path may include a line separate from the signal lines for carrying status information.

BRIEF DESCRIPTION OF THE DRAWINGS

In order that the invention may be more fully understood reference will now be made to the accompanying drawings in which.

DETAILED DESCRIPTION OF THE INVENTION

Figure 1:
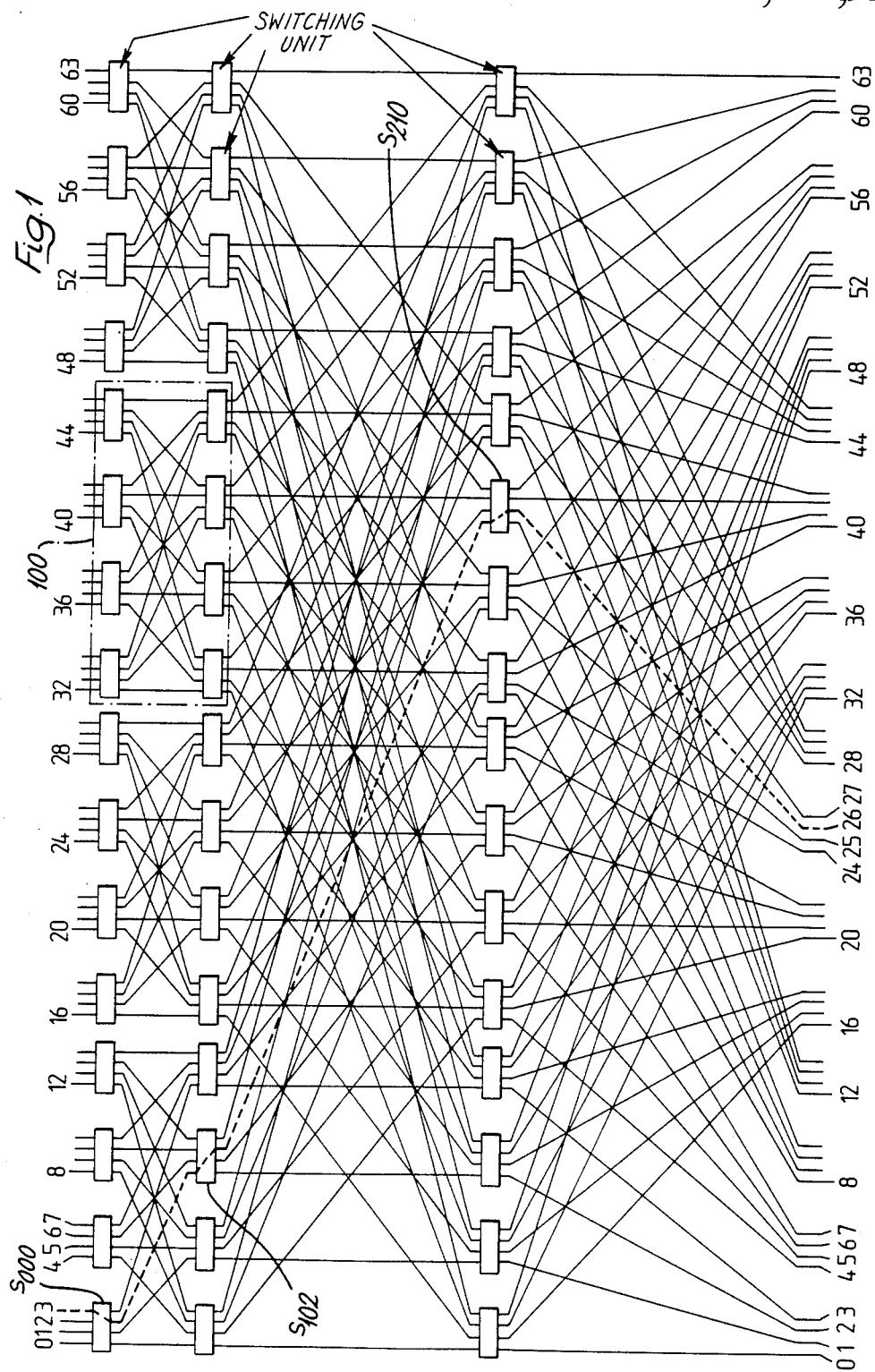
FIG. 1 is a diagram if a switching network embodying the invention.

Referring now to FIG. 1 there is shown therein an example of a switching network for connecting any one of 64 upper or source terminations labelled 0-63 to any one of 64 lower or destination terminations also labelled 0-63. The network thus constitutes a 64×64 switching network. It is shown made up of a number of interconnected switching units each of which can switch any one of its four upper or source ports to any one of its four lower or destination ports. Each switching unit in this example thus consists of a miniature 4×4 switching network. The switching units are arranged in three stages with sixteen units in each stage. The paths between the lower ports of one stage and the upper port of the next succeeding stage are arranged in the manner shown in FIG. 1 to provide a fully interconnected network.

The switching units S in the network can be conveniently defined by a first subscript 0, 1, 2 defining its stage and a second subscript 00 to 15 defining its position in a stage.

By way of example a path is shown set up in FIG. 1 from source terminal 3 to destination terminal 26. The path between these terminals passes through one switching unit in each stage of the diagram, these being S000, S102 and S210.

Figure 2:
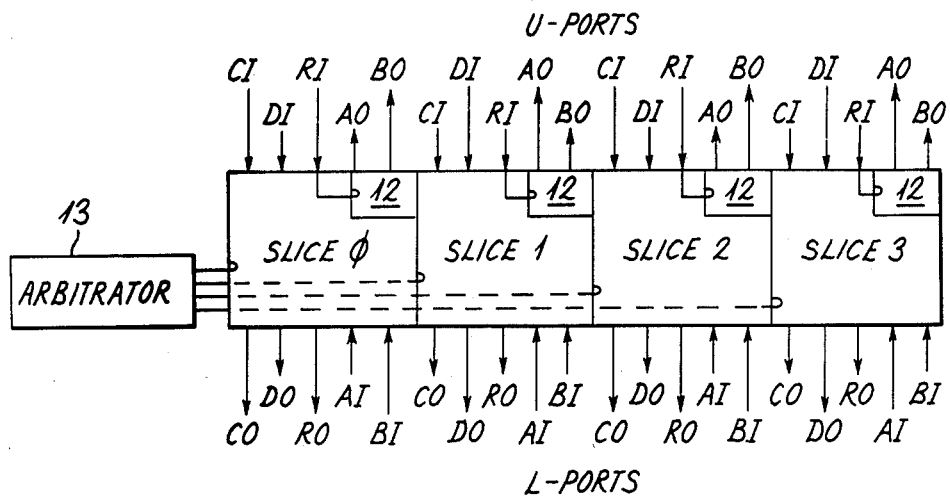
FIG. 2 shows a switching unit with its upper and lower ports.

An individual switching unit is shown in FIG. 2. It comprises four slices labelled slice 0, slice 1, slice 2 and slice 3. There is an upper or source port and a lower or destination port to each slice and any of the four upper ports can be switched through to any of the four lower ports in accordance with switching signals which are provided. It will also be seen from FIG. 2 that whereas each of the paths shown in FIG. 1 is in the form of a single line for simplicity, in fact each path comprises a bundle of five lines. In each slice of a switching unit the five connections of a port to the five lines of a path are labelled C, D, R, A and B. To distinguish the respective connections of an upper and lower port of a switching unit suffixes are added to the connections with the direction of information flow being marked by arrows and by a suffix I where the information is into the slice and by a suffix O where the information is out of the slice. It will thus be seen that the lines C, D and R of a path provide information from an upper to a lower stage whereas the lines A and B of a path provide information from a lower to an upper stage.

Figure 3:
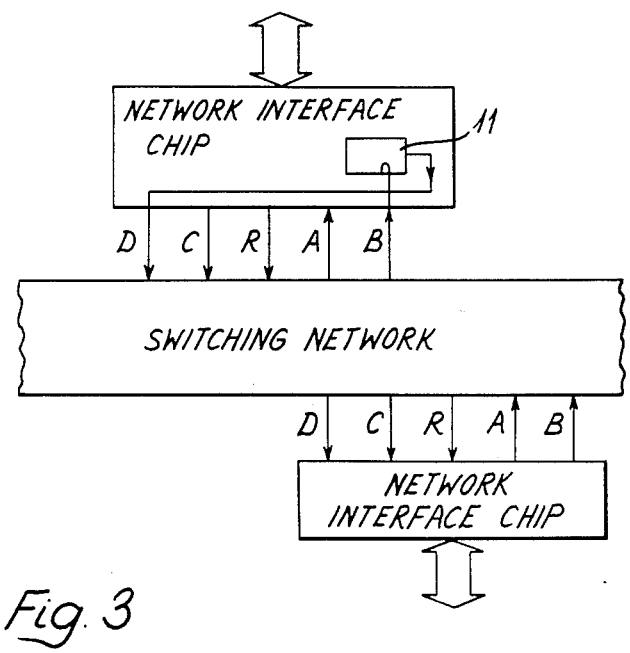
FIG. 3 shows how access to the network is obtained.

Connections between the network of FIG. 1 and the outside world is by way of network interface chips (NICs). Each input termination and each output termination is connected to its individual NIC and exemplary input and output NICs are shown in FIG. 3. Bearing in mind that each path of the network of FIG. 1 is a bundle of five lines, there is a corresponding bundle of five lines labelled D, C, R, A and B between each NIC and the network.

In use of the network shown in FIG. 1 a digital word representing the desired destination termination is fed into any one of the source NICs and held there in a shift register 11. In the network shown in FIG. 1 there are 64 possible destinations and these can be represented in binary digital form by a six digit word. Successive pairs of digits in any digital word defining a final destination select an appropriate one of four possible lower or destination ports in each switching unit in successive stages. The demand for the next pair of digits is initiated or called for by the switching unit switched to during the setting up of a path and it is not until then that the pair of digits required to switch that unit is transferred to the switching unit that has called for and now requires it. The network can simultaneously provide a number of different paths between source terminations and destination terminations but clearly in some circumstances a called for path may be blocked. Thus for example in the FIG. 1 network with a path already set up from source 3 to destination 26 it is not possible to thereafter set up a path from say source 6 to destination 42 until the first path is released. Furthermore, provision must be made to arbitrate if an attempt is made to set up both of these paths simultaneously. In this example arbitration will take place in switching unit S102.

The transaction of building a path through the network will now be described.

When a source NIC is loaded with a destination address this has the effect of initiating a transfer operation by causing the R line down from that NIC to be lowered. In the example shown in FIG. 1 if the shift register in NIC 3 connected to source termination 3 is loaded with a destination address, for example the destination address 26 which is represented by the digital word 011010, then the R line from NIC 3 will be lowered. This change of level in the R line is detected by switching unit S000 at upper port RI of slice 3. The change in level at RI results in the sending of a set of pulses up along the B line from upper port BO to the NIC. The set of pulses that is transmitted upwards comprises firstly a start pulse and is then followed by the number of pulses required to switch unit S000, which is two pulses. Thus a total of three pulses are sent up from connection BO of slice 3 of switching unit S000.

The start pulse up the B line initiates an operation of transfer from the shift register in the NIC of a number of address digits corresponding to the number of pulses following the start pulse that is sent up the B line. The transfer operation commences with the least significant digit in the shift register. For the transfer down of the called-for address bits the C and D lines are used. The C line carries clocking pulses while the D line carries the address bits which are synchronized with the clocking pulses in the C line. Each train of pulses is headed by a start bit which is generated directly or indirectly from the start pulse on the B line.

In the example illustrated with a 4-port switching unit two address bit are required. The first address bit that will be shifted from the shift register down the D line will be a '0' and this will be followed by a '1'.

Each slice contains its own shift register which is loaded from the D line on instruction from the C line and therefore the shift register of slice 3 will now hold the two digits 10. The completion of the loading of the register in slice 3 is acknowledged by raising the A line from the slice at connection AO, that is to say the connection AO from slice 3 is raised causing the corresponding line A in the source NIC to be raised. This acknowledgement may prepare the source NIC for a subsequent demand.

Switch S000 now goes into an arbitration cycle the purpose of which is to ensure that two or more transactions, that it to say attempts to build paths, do not attempt to claim simultaneously the same destination port within the switch unit. Arbitration is achieved by clocking the operation of each of the four slices of a switching unit in turn in cyclic fashion with slight delays between each slice so that each slice functions in turn. An arbitrator 13 is provided for this purpose the outputs of which enable each of the slices 0, 1, 2 and 3 in turn. Thus only one of the slices can claim any one of the four destination ports at any one instant. A similar arrangement is provided on release so that each slice releases is destination port in turn. It will be appreciated that this ensures that the arbitration is both fair and starvation free, in that any request waiting upon the release of a lower port will obtain access to that port before the upper port currently connected to it, and releasing it, may reclaim that port.

The contents of the shift register namely '10' in slice 3 has the digital value '2' and will cause the selection of the destination port of slice 2 of the switching unit and provided that this port is not in use all the upper connections of slice 3 are connected to all the corresponding lower connections of slice 2 of the switching unit and switch S000 becomes in effect transparent. Source NIC 3 is now directly connected to slice 0 of switching unit S102. This causes line A from the NIC which was previously high to acknowledge successful transfer of switching data now to become low through connection AO of slice 2 of unit S102 to indicate the successful switching of unit S000 and indicate the start of the next switching cycle, which is in unit S102. Additionally since the R line from NIC 3 is now directly connected to the RI connection of slice 0 of unit S102 the low condition at this connection will cause the initiation of a further demand for address bits for unit S102 by the sending up of a start pulse followed by two further pulses up line B.

The cycle of providing more of the available address bits down the shift register in NIC 3 now continues with the clock pulses being sent down line C, and the address bits down line D, in each case being headed by a start bit. In the example shown in FIG. 1 the address bits that require transfer to unit S102 will be a '0' followed by a '1' to cause selection of the lower port of slice 2 of unit S102 provided that this selection is not blocked by an earlier switching demand from another source. If switching is successful switch S102 becomes transparent and NIC 3 is directly connected to switch S210.

The switching process is repeated a third time and can be continued for as many times as there is a demand and switching digits are available in the source NIC. Finally, when the last stage has switched to the designated output, in this case destination NIC 26, completion of the path is signalled by raising the B line high and sending a pulse on the A line.

All five lines are now directly connected from source NIC 3 to destination NIC 26. Of these lines, lines C and D are available for downward communication between source and destination while lines A and B are available for upward communication from destination to source. The R line is held low to maintain the links through the switching units.

When the linking is no longer required it is broken by the source NIC raising the R line high. This high is propagated down the line releasing the switches on each successive switching unit in turn.

One advantage of the network described above is that it is not necessary for all the switching units to be identical. For example the eight switching units enclosed within the dotted framework 100 could be replaced by a single large switching unit having sixteen upper ports and sixteen lower ports. The network will still function as before. The only difference now is that the large switching unit will request twice as many switching bits as each of the original 4×4 switching units. The presence of this large switching unit will be completely undetectable to any equipment connected through the network, including the NICs. The network is thus structure independent.

The network can be increased or decreased in size and its structure, including the number of units per stage, can be altered without affecting any of the systems connected to the network. It is not even necessary for each stage in the network to have the same number of switching units since all that will happen if for example the final stage has a lesser number of switching units is that fewer sets of switching bits will be called for where the network switches to a destination connected to the penultimate stage rather than the final stage.

In the network described above each path consists of a bundle of five lines. It is possible to construct a network embodying the invention with fewer lines than five. A three wire path could be provided if desired in which case one of the paths will act in a similar manner to the R line described above and will carry out the functions of forward requesting, holding and clearing. Another line will provide for a return protocol path which on completion of a switching transaction can become a path for transfer of data back from the destination to the source. The third line will be the forward addressing path down which switching bits are transferred when requested and on completion of a route will carry data from the source to the destination.

Furthermore while in the switching protocol described above start bits are used it is possible to omit the start bits in which case it is only the address bits that are transferred down the line and some facility may be required to acknowledge receipt of an address after as many bits as needed have been clocked in. Alternatively phase or multi-level encoding can be used to remove the necessity for an explicit start bit. An alternative provision to the provision of start bits is applicable both to a three wire and a five wire system.

By use of tri-level logic encoding all of the abovementioned protocols may be conveniently combined into a three wire bundle. The A and B signals may be encoded onto a single wire by using mid/high and mid/low logic transitions respectively. Similarly C and D signals may be encoded onto a single wire: a mid/high transition indicating a 1 and a mid/low transition indicating a 0, for example. Furthermore encoding a clock signal with the R signal on one wire enables a preceding stage to supply a clock to its following stage so that a separate clock for generating the burst signal is not required. This has the advantage of eliminating the synchronization which would otherwise be required between the R signal and the internal clock of the stage generating the burst signal. Reduction below three wires per bundle is possible but requires a complex combination of encoding techniques.

It will be appeciated that the network is asynchronous in the sense that each of the four slices of any switching unit can function independently of the switching being carried out in any other slice so that routing requests can be received at any time relative to one another. The only provision that needs to be made is some arbitration provision for ensuring that there is no attempt to switch to any single lower port from two slices at the same time such as has been described. The network is self-clocked in the sense that it requests only as many switching bits as are required at any one time and only when it is ready to accept them. Thus no global system of clocks for synchronization is required and no separate data transmission clocks are required at the source nodes.

We claim:

1. A serial switched interconnection network which receives switching signals from external sources, said network comprising:

a plurality of stages of switching nodes, each node having a number of paths thereto and a number of paths therefrom; and a switching unit being provided at each node to connect any path thereto to any path therefrom in accordance with the switching signals, the nodes of successive stages being so interconnected that any path to the first stage of nodes can be ultimately connected to any path from the final stage of nodes, each switching unit having means for sending a request back up a path thereto when addressed along that path for the switching signals to switch the switching unit from which such request is sent and means enabling the selfsame switching unit to switch that path to a path therefrom on receipt of the switching signals provided in response to such request.

2. The network as claimed in claim 1 in which the means for sending a request for switching signals comprises means for requesting only those switching signals which are sufficient to switch the unit from which the request is initiated.

3. The network as claimed in claim 1 in which each switching unit has source ports and destination ports with the paths to a node being connected to the source ports and the paths from a node emerging from the destination ports.

4. The network as claimed in claim 3 in which the number of source ports and the number of destination ports in a switching unit are equal.

5. The network as claimed in claim 1 in which network interface units are provided at the beginning of each path to the first stage of switching nodes, each network interface unit including a shift register for storing switching signals representing the address of the required final destination to which that interface unit is to be switched.

6. The network as claimed in claim 4 in which each switching unit comprises a number of sections or slices to each of which a source port and a destination port are connected, and wherein a switching unit operates to connect the source ports of any one section thereof to the destination ports of any section thereof in accordance with switching signal received at a source port.

7. The network as claimed in claim 6 in which each switching unit has arbitration means for polling the individual sections thereof in cyclic fashion so that the sections operate one at a time in sequence whereby no more than one section can claim the destination port of any other section at any one time.

8. The network as claimed in claim 1 in which each path comprises a plurality of lines.

9. The network as claimed in claim 8 in which there are separate lines in each path for the passage of signals in respective opposite directions.

10. The network as claimed in claim 9 in which each path includes a line separate from the signal lines for carrying status information.

* * * * *